United States Patent [19]
Saito et al.

[11] Patent Number: 5,598,735
[45] Date of Patent: Feb. 4, 1997

[54] HOLLOW STABILIZER MANUFACTURING METHOD

[75] Inventors: Tsutomu Saito; Takashi Fukui; Akio Namikiri, all of Yachiyo, Japan

[73] Assignee: Horikiri Spring Manufacturing Co., Ltd., Yachiyo, Japan

[21] Appl. No.: 287,955

[22] Filed: Aug. 9, 1994

[30] Foreign Application Priority Data

Mar. 29, 1994 [JP] Japan ................... 6-083851

[51] Int. Cl.⁶ .................................................. B21D 9/00
[52] U.S. Cl. .................. 72/369; 72/217; 72/307; 72/388
[58] Field of Search ............... 72/369, 217, 218, 72/219, 307, 388, 53, 58, 367; 204/129.1, 129.46

[56] References Cited

U.S. PATENT DOCUMENTS

| | | | |
|---|---|---|---|
| 4,841,760 | 6/1989 | Ferguson | 72/369 |
| 4,882,019 | 11/1989 | Lewy | 204/129.1 |
| 4,936,503 | 6/1990 | Hinds et al. | 72/367 |
| 5,103,666 | 4/1992 | Schroeder | 72/369 |
| 5,294,309 | 3/1994 | Seimiya et al. | 204/129.46 |

FOREIGN PATENT DOCUMENTS

| | | | |
|---|---|---|---|
| 9001113 | 9/1991 | Finland | 72/369 |
| 0014420 | 1/1982 | Japan | 72/369 |
| 0076232 | 4/1985 | Japan | 72/369 |
| 0154827 | 8/1985 | Japan | 72/369 |

*Primary Examiner*—Daniel C. Crane
*Assistant Examiner*—Ed Tolar
*Attorney, Agent, or Firm*—Lackenbach Siegel Marzullo & Aronson

[57] ABSTRACT

A method of manufacture of a hollow stabilizer for automobiles which uses a heat-finished seamless steel pipe 20 as a material, comprising an inner surface and/or an outer surface of a part corresponding to a bending R portion A-B of the steel pipe 20 is polished to remove defects of the surface of the steel pipe, and after the above surface roughness is made less than Rmax 50 μm, the part corresponding to the above bending R portion is previously formed an ellipse in section, and then the section after bending process accesses to a true circle to alleviate stress concentration of the bending part.

12 Claims, 13 Drawing Sheets

HOLLOW STABILIZER MANUFACTURING METHOD

BACKGROUND OF THE INVENTION

This invention relates to a method of manufacturing a hollow stabilizer, which decreases car rolling during turns. This invention relates, more particularly, to a method of manufacturing a hollow stabilizer made of heat-finished seamless steel pipe which is useful for a variety of small- and large-sized vehicles.

FIG. 14 is a perspective view which shows an embodiment of a stabilizer for a car and its use. The stabilizer 1 shown in FIG. 14 is U-shaped at a plan view and an intermediate part 2 thereof is active as a torsion bar spring, while both end portions 3, 3 of said intermediate part 2 are active as arms. Said intermediate part 2 is rotatably attached to a car body (not shown) through a rubber bush 4, and both of said ends 3, 3 are attached to suspension arms 7, 7 of wheels through link rods 5, 5, respectively. The stabilizer 1 increases riding comfort and driving stability by decreasing car rolling during turns.

The form of the stabilizer 1 can be many different types, e.g., a trapezoid, a reversal triangle or the like.

A hollow stabilizer has recently been developed in order to make car parts lighter and a hollow stabilizer made of seam-welded steel pipe has been used for vehicles having small weight loads, such as passenger cars and small-sized commercial vehicles. On the other hand, stabilizers made of non-hollow materials are used for vehicles having large weight loads, such as trucks, buses and the like, because the conventional hollow stabilizer cannot sustain the heavy loads of large vehicles such as trucks, buses and the like.

FIG. 15 is an explanatory chart which shows the relation in durability between a welding bead part and a part other than the welding bead when the seam-welded steel pipe is used for the hollow stabilizer.

As described above, the conventional hollow stabilizer is formed by a seam-welded steel pipe, said seam-welded steel pipe wound into a pipe and used by welding connection with electric resistant heating after extending band steel for mechanical construction and cold rolling. However, since a structure of the welding connecting portion forms a band structure of ferrite, even if quenched and tempered, the hardness of the welding bead portion is low and its portion decreases fatigue strength as shown in FIG. 15, whereby necessary durability cannot be obtained when it is used as a hollow stabilizer of a larger car. The results shown in FIG. 15 are a case tested at 45 Kgf/mm² of stress.

FIG. 16 is an explanatory view which shows the relation between the depth of a linear crack in a spring steel and the fatigue life thereof, and FIG. 17 is an explanatory view which shows the influence a decarburization layer exerts on the fatigue strength of the spring steel.

Generally, when a spring steel is subjected to hot rolling, defects such as scab cracks or shock cracks occur as a result of inappropriate hot working, careless treatment of steel materials and the like, in addition to material defects such as linear cracks or the like. Further, when the steel is heated at a high temperature, its surface reacts with oxygen, carbon dioxide gas and vapor in an atmosphere to cause oxidation and decarburization.

As described above, when there exist such defects like linear cracks, scab cracks, shock cracks or the like, fatigue life is influenced even if the crack is shallow as shown in FIG. 16, illustrated with respect to a linear crack of a spring steel (tested by loading a torsion stress $Tm \pm Ta = 48 \pm 37$ Kgf/mm² on a drawing material having a 13.5 mm diameter).

Further, in said oxidation and decarburization, the decarburization generally advances faster than the oxidation, thereby forming a decarburization layer and an oxidation scale on the surface of the steel. In a spring steel having decarburization, even if a certain quenching is carried out, a sufficient hardness cannot be obtained and since there exists an area where the fatigue strength decreases suddenly as shown in FIG. 17, the depth of the decarburization must be as small as possible. An alloy component of the spring steel is shown in FIG. 17 wherein the spring steel (1) is C 0.53, Si 1.78, Mn 0.72 and spring steel (2) is C 0.58, Si 1.75, Mn 0.03.

Such phenomenon also occurs in seamless steel pipes of hot finishing. Accordingly, when the heat-finished seamless steel pipe is only used as stabilizer material, not only do cracks occur on the surface of the steel pipe, but also decarburization of 0.1–0.4 mm in length in the depth direction. Accordingly, the fatigue strength decreases sharply. Further, since the stabilizer uses the heat-finished seamless steel pipe by performing bending process, if the part having the surface defect described above is wound, the fatigue strength at the bending R portion decreases more violently.

Although there is a method of carburizing treatment and cold drawing work as ways to prevent decarburization, such methods are expensive (about 3 times the cost of heat treatment) and poor in utility.

FIG. 18 is a side view of a conventional pipe bender, FIG. 19 is a side view which shows it in operation, FIG. 20 is an enlarged sectional view of the stabilizer subjected to bending process by the pipe bender, and FIG. 21 is an explanatory view which shows the relation between a pipe coefficient $\lambda$ (bending degree) and a stress increasing rate proposed by Karman (relation between the pipe coefficient $\lambda$ and pipe elements shows the formula 1. The pipe coefficient $\lambda$ is constructed by a pipe thickness ratio $t_0/d_2$, a bending ratio $R_0/d_2$ and a central radius of bending $R_0$).

$$\lambda = 4(t_0/d_2 \cdot R_0/d_2) \times (1 - t_0/d_2)^{-2}.$$

The pipe bender 11 in FIG. 18 and FIG. 19 is provided with a rotational bending type 12, a holder type 13 arranged at the inner side of the bending center of the steel pipe to be worked and a pressure type 14 and a clamp 15 arranged at the outer side of a bending center of said steel pipe 10. Said pressure type 14 and clamp type 15 are arranged at a fixed interval, and provided so as to be movable around the rotational bending type 12.

Further, the material steel pipe 10 is inserted between a group of the rotational bending type 12 of the bender 11 and a group of the pressure type 14 and the clamp type 15 whereby the rotational bending type 12 is allowed to rotate and allowed to move the pressure type 14 and the clamp type 15 around the said rotational bending type 12. At this time, said pressure type 14 and clamp type 15 move pressing the bending portion R of said steel pipe 10 to the rotational bending type 12 thereby performing a bending process to said steel pipe 10 at a certain angle.

When the hollow stabilizer is manufactured by bending the steel pipe with pipe bender 11, the sectional form of the bending R portion is formed as a long and flat sectional surface in a vertical direction with respect to an axis which combines the inner side E and the outer side F of the bending center as shown in FIG. 20.

When the bending portion R of the hollow stabilizer is formed as said flat sectional surface, the stress increases according to the degree of bending as shown in FIG. 21 whereby the durability decreases according to the increase in stress. Accordingly, the hollow stabilizer wherein only the steel pipe is subjected to the bending process is unsuitable for a larger vehicle on which large loads are exerted.

The main object of this invention is to provide a method of manufacturing a hollow stabilizer by using a heat-finished seamless steel pipe as a material which is light in weight, able to withstand large loads, great in fatigue strength, superior in durability and able to lower costs.

Another object of this invention is to provide a method of manufacturing a hollow stabilizer having a stronger fatigue strength and durability.

BRIEF DESCRIPTION OF THE INVENTION

In order to attain the above objects, the first embodiment of the invention is characterized by the fact that in a method of manufacturing a hollow stabilizer for vehicles which uses a heat-finished seamless steel pipe as a material, at least either an inner surface or an outer surface of a part which corresponds to a bending R portion of said material is polished to remove defects in the steel surface thereby working it after the roughness in the surface Rmax is made less 5u μm.

Further, to attain said object, in a method of manufacturing hollow stabilizers which uses a heat-finished seamless steel pipe as a material, a part corresponding to a bending R portion of said material steel pipe is formed so that its section having a certain flat rate long in an axial direction which previously combines the inner side and the outer side of the bending center may be ellipse-shaped, and then performs a bending process thereby forming the sectional form of the bending R portion after the bending process to be approximately a circular form.

To attain the above object, in a method of manufacturing the hollow stabilizer which uses a heat-finished seamless steel pipe as a material, at least either the inner surface or the outer surface of the part which corresponds to a bending R portion of said material is polished to remove the defects in the steel surface and to make the surface roughness less Rmax 50 μm, the part corresponding to said bending R portion is formed so that its section having a certain flat rate long in an axial direction which previously combines the inner side and the outer side of the bending center may be an ellipse form, and then performs a bending process thereby forming a sectional form of the bending R portion to be approximately circular.

In order to attain said object, the depth of polishing is 0.05–0.5 mm.

Further, in order to attain said object, the surface roughness is Rmax 10–50 μm, preferably 10–30 μm.

Furthermore, the flat rate of said ellipse form is 10–19%, preferably 15–19%.

Defects in the steel surface means linear cracks, scratches, shocks, wrinkles, scab and scale cracks, skin chapping or overheating which decreases the fatigue strength of the decarburization layer and the oxide layer.

The measurement of the surface roughness is performed according to the JIS (Japanese Industrial Standard) method.

The flat rate is shown in "formula 2" described later.

In the first embodiment of the invention, a heat-finished seamless steel pipe is used as a material. One or both of the inner and outer surface parts corresponding to the bending R portion of said steel pipe is polished to remove the defects in the steel pipe surface and the surface roughness is made to be less than Rmax 50 μm. Then, a part of the steel pipe surface from which the defects have been removed is subjected to the bending process.

Thus, since the heat-finished seamless steel pipe which can be manufactured at a uniform fatigue strength is used as a stabilizer material, a hollow stabilizer that is both light weight and highly durable can be manufactured.

Further, the part corresponding to the bending R portion of the material steel pipe is polished to remove surface defects and subjected to a bending process after decreasing the surface roughness less than Rmax 50 μm. Accordingly, various kinds of cracks on the surface and decarburization layer of the bending R portion are removed, whereby the decrease of the fatigue strength on the surface of the bending R portion can be prevented and is available to a large type stabilizer.

In addition, since a treatment such as decarburization is not necessary, costs can also be decreased, and since only necessary parts are polished, further cost reduction is available.

In the second embodiment of the present invention, the part corresponding to the bending R portion of said steel pipe is formed so that the section having a certain flat rate long in an axial direction which previously combines the inner side and outer side of the bending center may be ellipse-shaped. Then, the part corresponding to said bending R portion is subjected to a bending process whereby the sectional form of the bending R portion after the bending process is adapted to be nearly circular.

Thus, since the heat-finished seamless steel pipe which is possible to be made at a higher and nearly uniform fatigue strength is used as a material, a hollow stabilizer being lightweight and highly durable can be produced. Further, the part corresponding to the bending R portion is ellipse-shaped previously and the sectional form after bending process is adapted to be nearly circular. Accordingly, it is able to provide necessary fatigue strength for large loads even if it is used as a stabilizer for a large car. In addition, only a portion corresponding to the bending portion R of the material steel pipe is formed in an ellipse-type section whereby the above stabilizer can be put to practical use at reduced costs.

In this invention, the flat percentage of said ellipse form is 10–19%, preferably 15–19%. By this, when the part corresponding to said bending portion R is worked, the section form thereof can be closed to a circular form more securely, thereby increasing durability.

At least one of the inner surface and the outer surface of the part corresponding to the bending portion R of the material steel pipe surface and the surface roughness is made less than Rmax 50 μm, and the part corresponding to said bending portion R is formed so that the section long in an axial direction which previously combines the inner side and outer side of the bending center may be an ellipse form. Then, the part corresponding to said bending portion R is subjected to bending process whereby the sectional form of the bending portion R is adapted to be nearly circular.

Thus, in this invention, since the seamless steel pipe of the hot finishing which is able to provide large fatigue strength and nearly uniform fatigue strength is used as a material, a hollow stabilizer which is light in weight and highly durable can be obtained. Further, since the part corresponding to the bending portion R of the material steel pipe is polished to remove surface defects, the surface is smooth and the decrease of the fatigue strength due to various kinds of cracks in the steel pipe surface is prevented, the part corresponding to the bending portion R is previously formed as an ellipse section and nearly circular after working, and stress increases by forming the section of the bending portion R to be flat thereby decreasing the durability by itself, and the durability of the hollow stabilizer can be greatly improved.

Further, the depth of the polish at the part corresponding to said bending portion R is 0.05–0.5 mm, the surface defect of the part corresponding to the bending portion R in the heat-finished seamless steel pipe can be removed securely to an extent which does not affect practical application.

In this case, the fact that the depth of the polishing is 0.05 mm–0.5 mm is set, is due to the danger that if the depth of the polishing is less than 0.05 mm, surface defects of the steel pipe might not be removed and there is no need of polishing over 0.5 mm, while polishing over 05.mm increases costs which results in a decrease in use.

Further, the depth of the polishing at the part corresponding to said bending portion R is made 0.05–0.5 mm and the surface roughness thereof is finished to be Rmax 10–50 μm. By this, since the surface defects of the steel pipe are removed and the surface smoothed, the fatigue strength of the hollow stabilizer increases, thereby improving durability.

The fact that the surface roughness is made Rmax 10–50 μm in addition to the polishing is because there is no need to finish a mirror surface less than Rmax 10 μm of the surface roughness and finishing to that value raises costs, while a value more than Rmax 50 μm cannot obtain a sufficient fatigue strength.

Further, in this invention, since said surface roughness is adapted to be finished to Rmax 10–30 μm, the surface can be finished more smoothly after removal of the surface defects in the steel pipe, thereby being able to further improve the fatigue strength of the hollow stabilizer.

Furthermore, the flat rate of said ellipse form 10–19% is preferably 15–19%. By this, the sectional form, when the part corresponding to said bending portion R is subjected to the bending process, can access a circular form securely, thereby increasing durability.

The reason that the flat rate is set at 10–19% is because when the flat rate is less than 10% or over 19%, a satisfactory true circular degree after each bending process could not be obtained as a result of the test.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

The embodiment of this invention will be described as follows with reference to the drawings.

Figure 1:
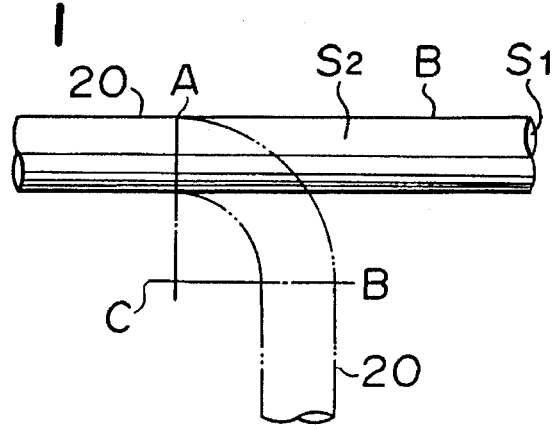
FIG. 1 is a side view of a seamless steel pipe of a hot finishing which is a material of a hollow stabilizer according to claim 1 of this invention.
Figure 2:
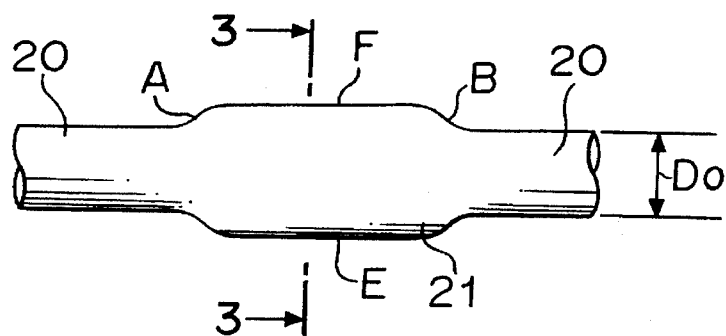
FIG. 2 is a side view of a part formed in an ellipse section a par corresponding to a bending portion R of a heat-finished seamless steel pipe which is a material of this invention according to claim 2.
Figure 3:
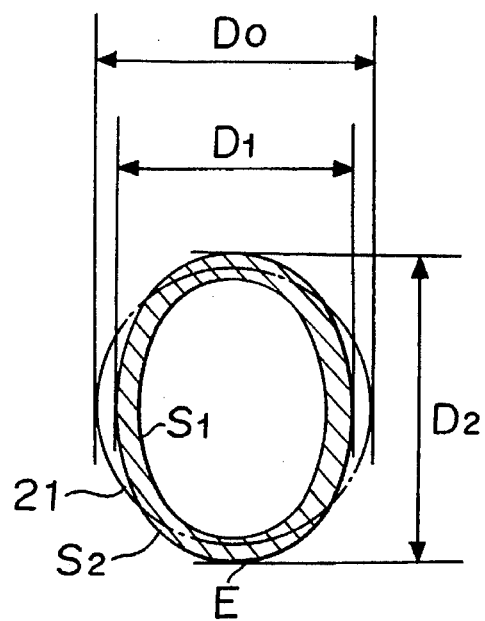
FIG. 3 is an enlarged sectional view taken in 3—3 line of FIG. 2.

FIG. 1 is a side view which shows an embodiment of a heat-finished seamless steel pipe which is a material of a hollow stabilizer according to this invention. FIG. 2 is a side view which shows an embodiment wherein a part corresponding to a bending portion R of the seamless steel pipe of this invention is previously formed as an ellipse, FIG. 3 is a sectional view taken in FIG. 2, and FIGS. 4–7 are fatigue characteristic views of the hollow stabilizer manufactured by a method of manufacture according to this invention.

One embodiment wherein a method of manufacture according to claim 1 of this invention is applied to a stabilizer for large trucks will be described based upon FIG. 1 and FIGS. 4–7.

As a material of the hollow stabilizer of this invention, a heat-finished seamless steel pipe 20 as shown i FIG. 1 is used. The heat-finished seamless steel pipe 20 is manufactured by ordinary hot rolling.

The seamless steel pipe 20 by hot rolling used for this embodiment is a material which includes an alloy component as a material for springs, said material being 41–43 HRC in heat treatment hardness, 42.7 mmΦ in diameter and 7 mmt in thickness. The weight as a hollow stabilizer is about 9.1 kg.

On the other hand, a substantial (not hollow) stabilizer corresponding to the above hollow stabilizer is about 14.6 kg. in weight. Accordingly, nearly a 37% of weight decrease can be performed by use of the hollow stabilizer.

In a hollow stabilizer for a large truck, in material diameter 55 mmΦ, thickness 12.5 mmt, the weight is 26.1 kg., while the substantial weight corresponding to the above hollow stabilizer is 33.3 kg. Accordingly, a weight decrease of about 21% can be obtained. The weight of automobiles can be greatly decreased.

Further, one or both of inner surface $S_1$ and outer surface $S_2$ of a part corresponding to the bending R portion A-B of the heat-finished seamless steel pipe 20 is polished. First, the polishing of the inner surface is described with reference to the embodiment, then the polishing of only the outer surface and polishing of both surfaces are explained in order.

The part corresponding to said bending R portion A-B is decided by the size and form of the stabilizer to be manufactured. This embodiment is within a range of 90° from an initial starting point of bending A to an end point B with respect to the bending center C as shown in FIG. 1.

Polishing methods such as grinding, paper, buff, steel shot, bead shot, alumina shot, electrolysis, etc. are used.

In this embodiment, the inner surface S of the bending R portion of the seamless steel pipe is polished by a grinder.

Figure 4:
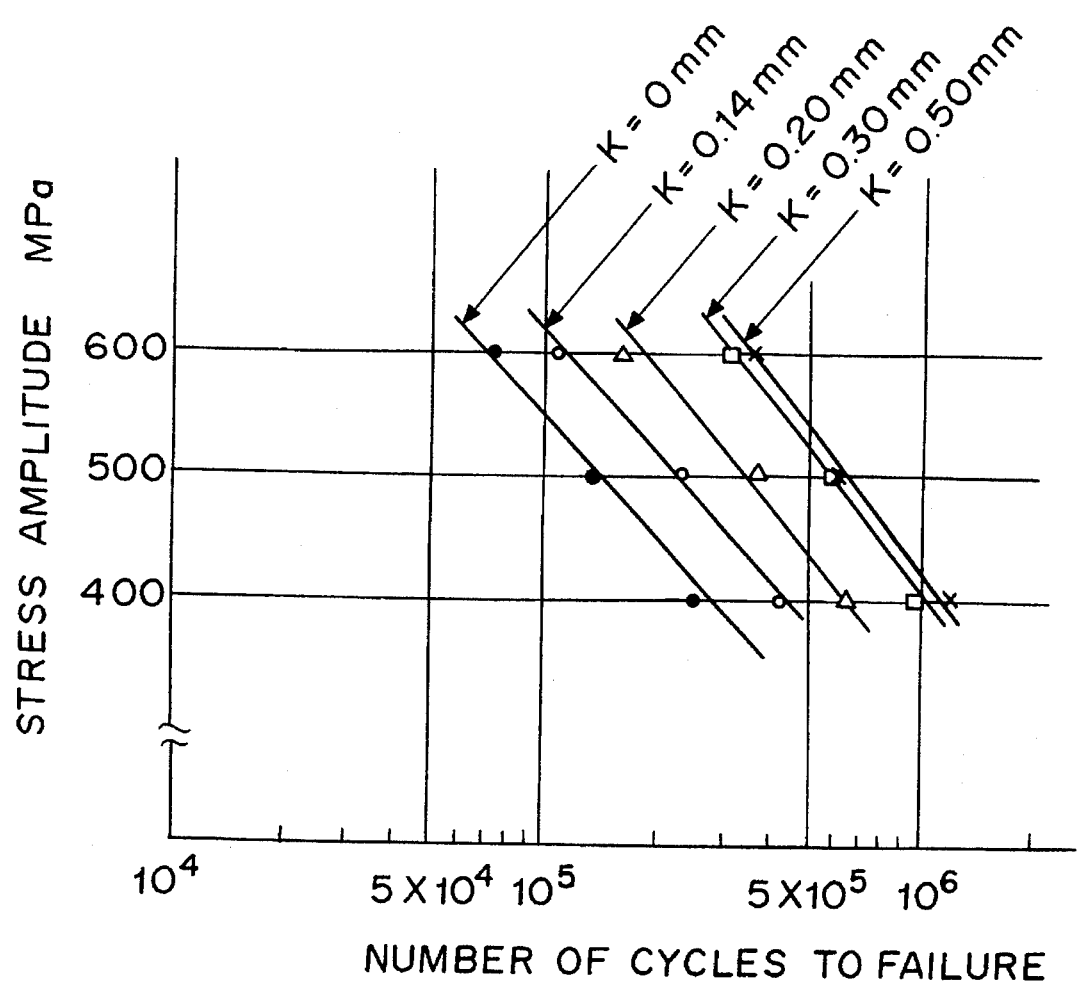
FIG. 4 is a chart which shows fatigue characteristics of the hollow stabilizer manufactured by this invention and an inner surface thereof polished.

When the depth K of the polishing is 0.05–0.5 mm in this embodiment, a seamless steel pipe 20 having depth K, 0.14 mm, 0.20 mm, 0.3 mm, 0.5 mm, and surface roughness Rmax 30 μm between the depth K of polishing 0.05 and 0.5 mm is manufactured as shown only inner surface in FIG. 4. The fatigue characteristics of this product are compared with a non-rolling treatment (black) skin or K=0 mm.

The fatigue characteristic applies a certain stress amplitude (e.g., 400, 500, 600 MPa) with a normal fatigue test machine and is shown by the amplitude number at the time of breaking. FIG. 4 shows a fatigue characteristic of a produced hollow stabilizer by polishing the inner surface $S_1$ of the steel pipe to make appointed polishing depth K to make a fixed surface roughness Rmax 30 μm, then, after bending and heat treatment, performing a normal shot peening treatment on the outer surface of the stabilizer (shot peening of the outer surface is performed the same). Then, when the inner surface of the heat-finished seamless steel pipe 20 is polished to e.g., 0.3 mm in depth and the surface decarburization layer (black skin) at the time of rolling is removed perfectly, an increase of about 4 to 5 times the fatigue strength (life) can be obtained over the (black) skin merely being rolled as it is.

The fatigue life of the above seamless steel pipe having 0.5 mm of polishing depth is approximately the same as that of one 0.3 mm in depth. This shows that the inner surface defect is removed almost completely by polishing to 0.5 mm depth.

As described above, the polished depth K is made to be 0.05–0.5 mm and the surface roughness is finished to Rmax 10–50 μm, preferably 10–30 mm. By this, the part corresponding to the bending R portion A-B of the seamless steel pipe 20 of hot rolling removes surface defects and a smooth surface finish can be obtained.

Figure 5:
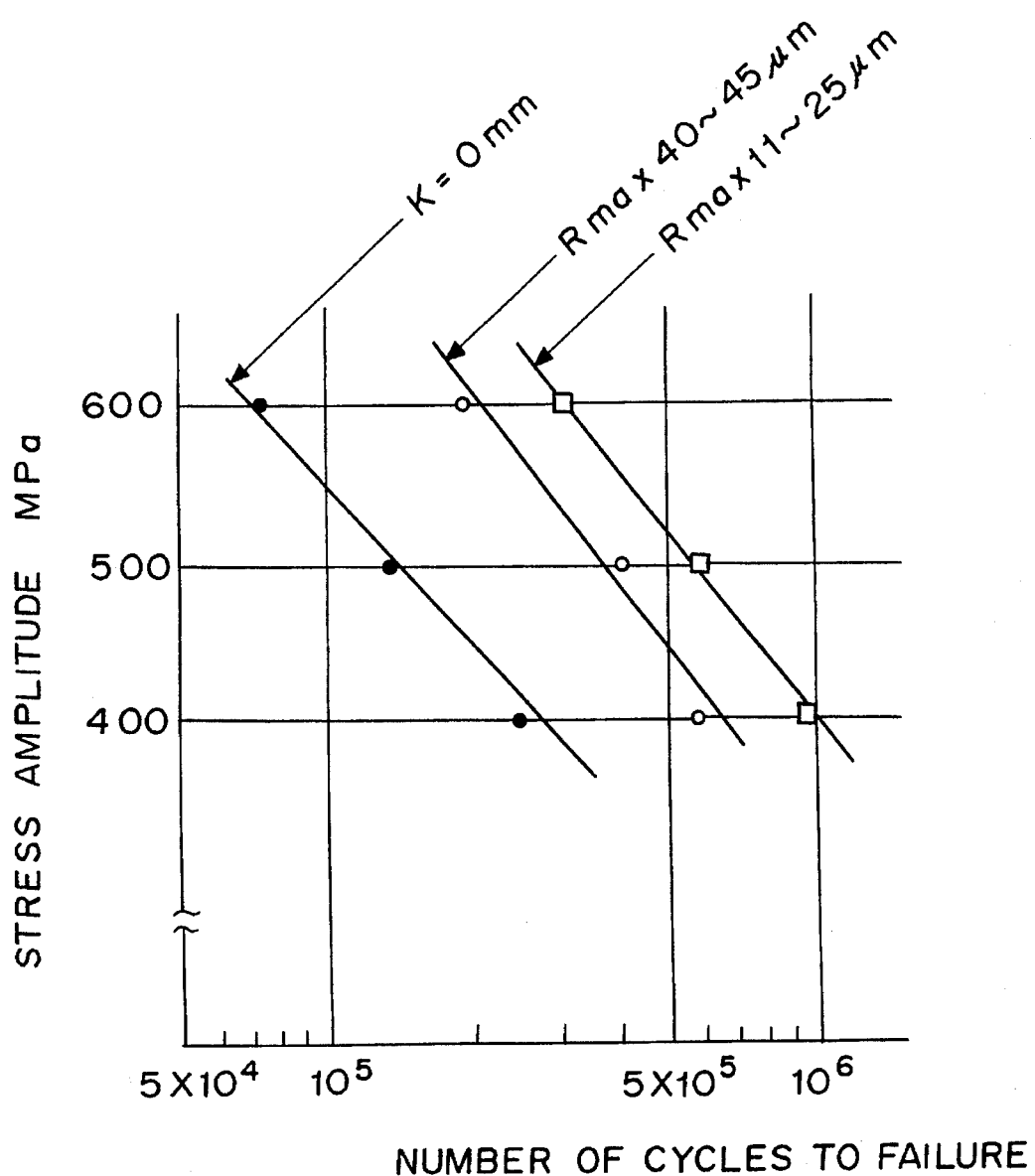
FIG. 5 is a fatigue characteristic chart of a hollow stabilizer manufactured by this invention and the inner surface polished to change the surface roughness thereof.

FIG. 5 shows the difference in the fatigue life when the surface roughness is Rmax 40–45 μm and Rmax 11–25 μm when the polishing depth of the inner surface is 0.3 mm.

By this, the fatigue strength of the hollow stabilizer can become larger and durability can also be improved by controlling the surface roughness to less than Rmax 50 μm. Further, by maintaining the surface roughness at less than Rmax 30 μm, the fatigue strength of the hollow stabilizer (production) can be larger and the durability thereof can be improved.

Further, there is no need to finish the surface roughness less than Rmax 10 μm and, on the contrary, costs increase. On the other hand, when the surface roughness exceeds Rmax 50 μm, there is the danger that sufficient fatigue strength is not obtained.

Figure 6:
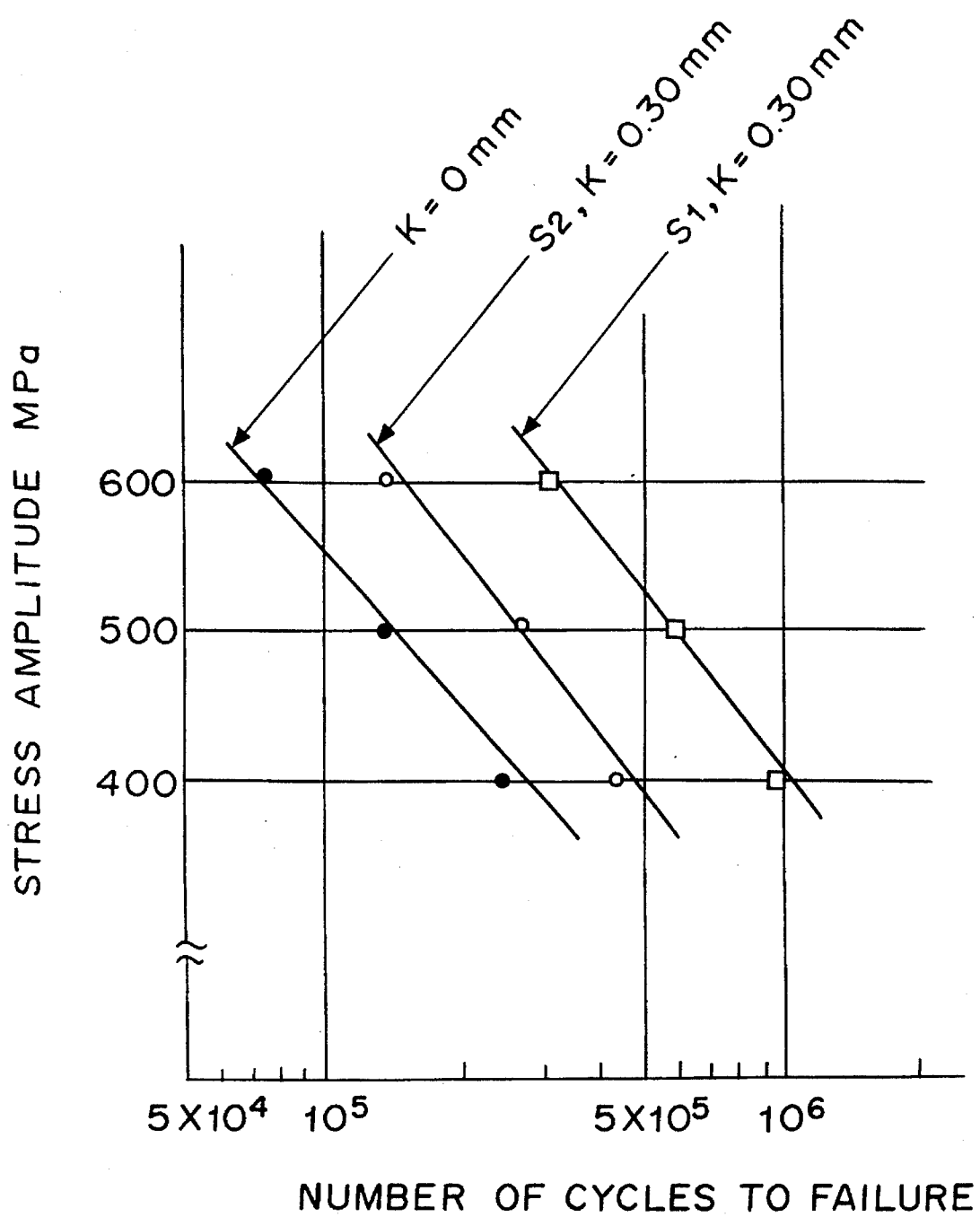
FIG. 6 is a fatigue characteristic chart of a hollow stabilizer by polishing the outer surface thereof manufactured by this invention.

FIG. 6 shows the improvement of the fatigue life of the hollow stabilizer when the outer surface of the heat-finished seamless steel pipe 20 is polished.

Namely, this shows the fatigue life when the outer surface of the part corresponding to the bending portion R of the seamless steel pipe 20 is polished to the depth K 0.3 mm by a grinder. The fatigue life of the hollow stabilizer which has the outer surface $S_2$ thereof polished is an improvement of about 2 times over the black skin (K=0 mm) not polished. This fatigue life improvement is a ½ life in the case of polishing the inner surface $S_1$. In other words, even when polishing only the outer surface $S_2$, a considerable life improvement can be obtained.

Figure 7:
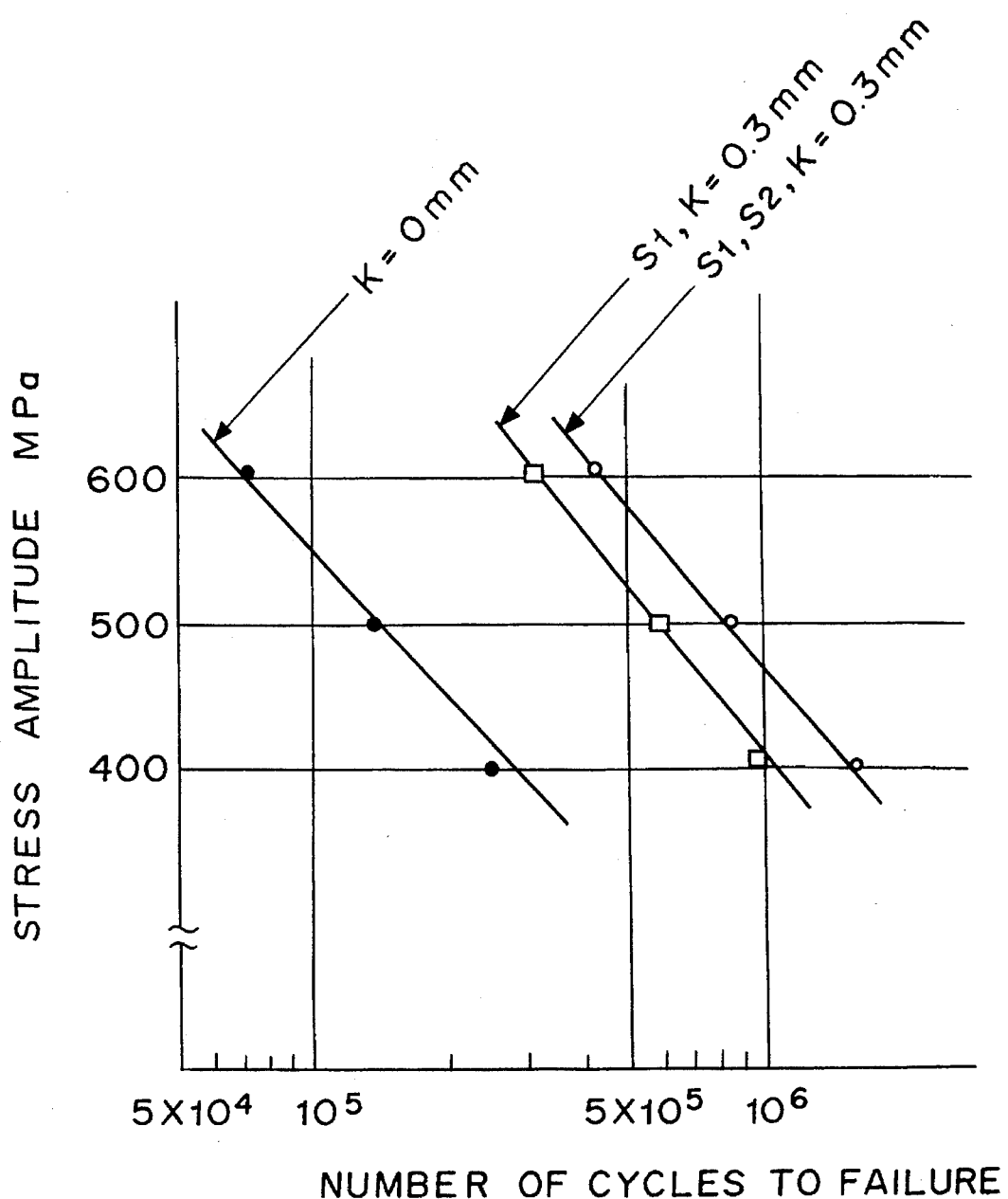
FIG. 7 is a fatigue characteristic chart of a hollow stabilizer with the inner and outer surfaces thereof polished manufactured by this invention.

FIG. 7 shows the fatigue of the hollow stabilizer when both of the inner and outer surfaces are polished.

In other words, FIG. 7 shows when the inner and outer surfaces $S_1$, $S_2$ of the bending portion R of the seamless steel pipe 20 are polished to 0.3 mm alike to make the surface roughness less than Rmax 30 μm. The seamless steel pipe 20 with both surfaces of the inner and outer surface $S_1$, $S_2$ polished has 1.5 times the fatigue life than where only the inner surface $S_1$ is polished.

Thus, the life of the seamless steel pipe 20 increases the life of, in order, black skin, outer surface polishing, inner surface polishing, polishing of both surfaces.

Namely, the seamless steel pipe improves the fatigue strength by polishing the pipe surface to remove surface defects.

Further, a large improvement in durability can be obtained by making the surface roughness of the polished surface less than Rmax 50 μm, and in particular less than Rmax 30 μm.

An embodiment of a method of manufacture of this invention according to claim 2 when it is applied to a stabilizer for a large truck will be described with reference to FIG. 2 and FIGS. 3–13.

First, as a material, a heat-finished seamless steel pipe 20 is used as shown in FIG. 1. The heat-finished seamless steel pipe 20 is prepared by conventional hot rolling as used in the above embodiment. Accordingly, the hollow stabilizer according to this method of manufacture can greatly decrease car weight.

Further, the part corresponding to the bending portion R of the heat-finished seamless steel pipe is formed so that the section having a certain flat rate long in an axial direction which combines the inner side E and the outer side F of the bending center C corresponding to the bending R portion A-B of the material seamless steel pipe 20 may be an ellipse form, then the sectional form of the bending R portion A-B after the bending process is formed to be nearly a circular form by a pipe bender described hereafter. A part formed to be an ellipse form in section is shown in FIG. 2 and FIG. 3 by numeral 21.

The method of forming the material heat-finished seamless steel pipe 20 is performed by urging said seamless steel pipe 20 in up and down directions with a conventional pushing method.

Figure 13:
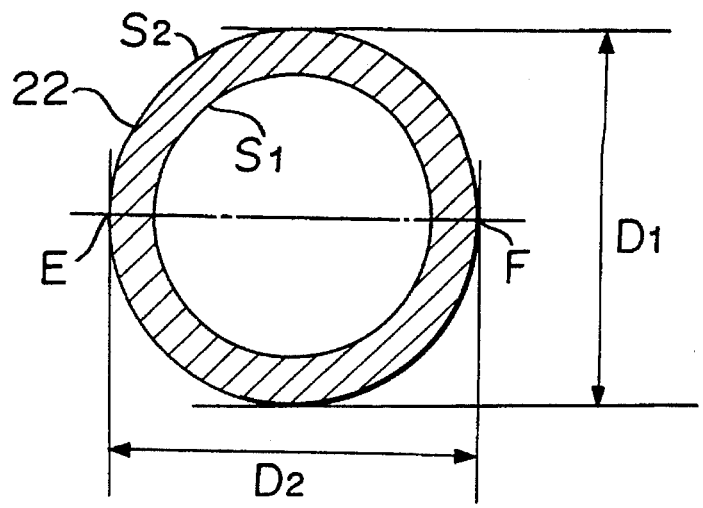
FIG. 13 is an enlarged sectional view take in Y—Y line of FIG. 10.
Figure 14:
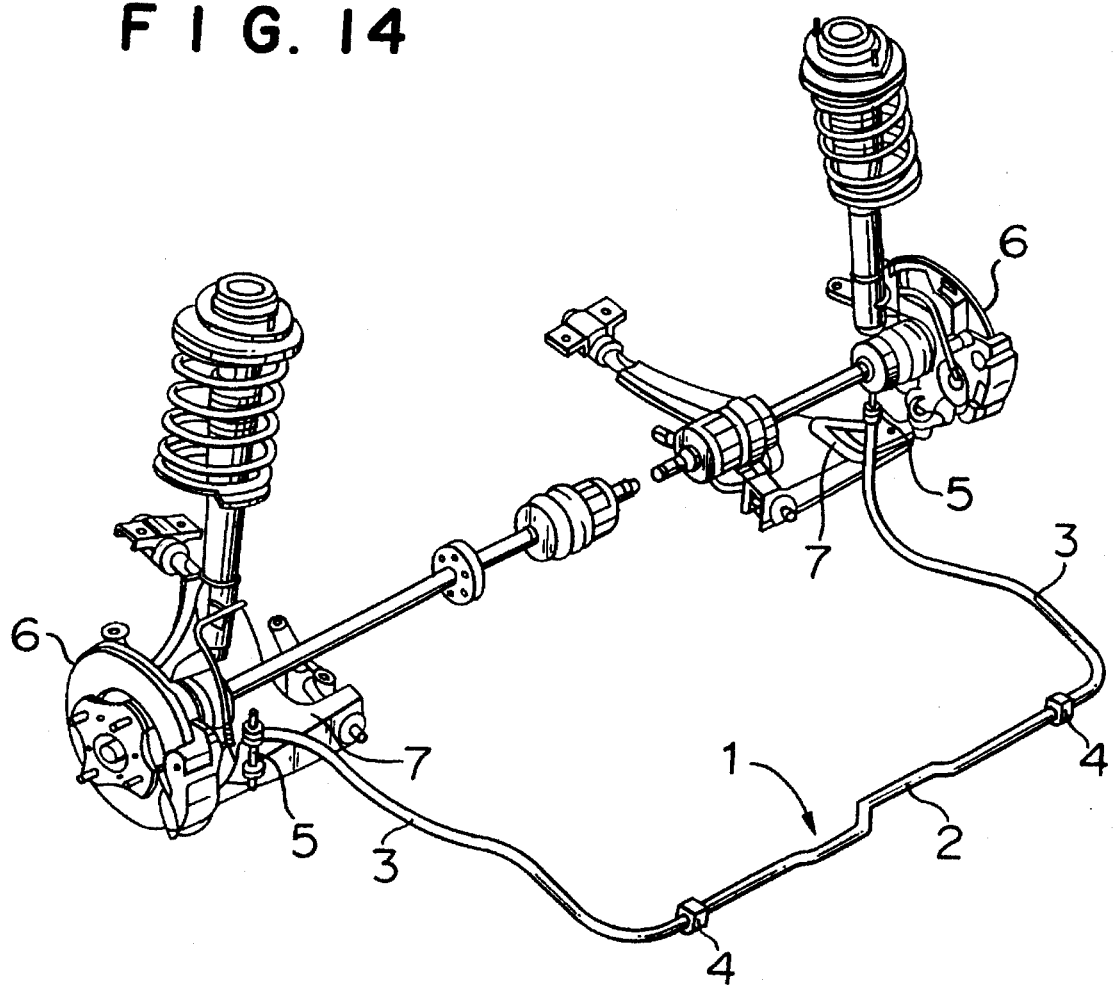
FIG. 14 is a perspective view of an embodiment of a stabilizer of a car.
Figure 15:
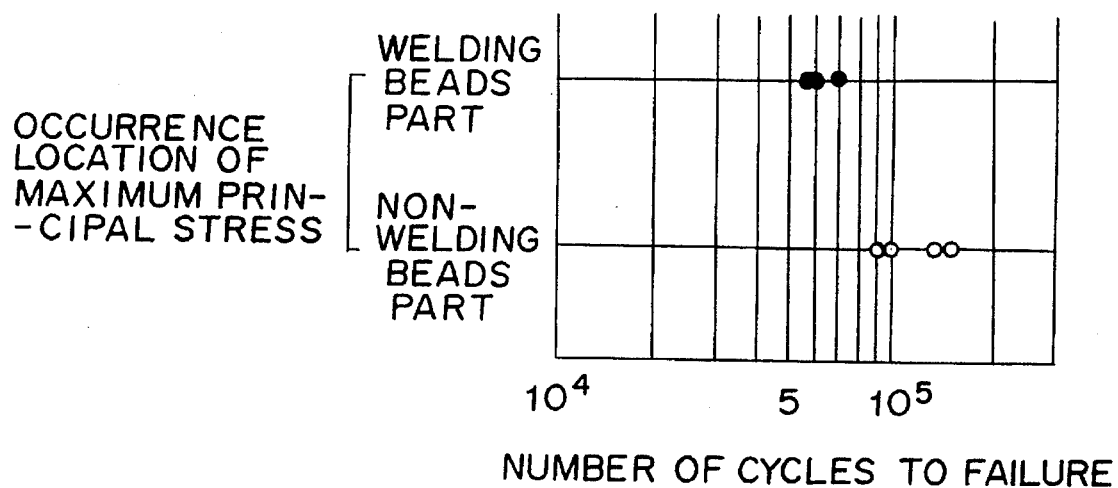
FIG. 15 is an explanatory chart which shows the relation between the depth of a linear crack of a spring steel and the fatigue life thereof.
Figure 16:
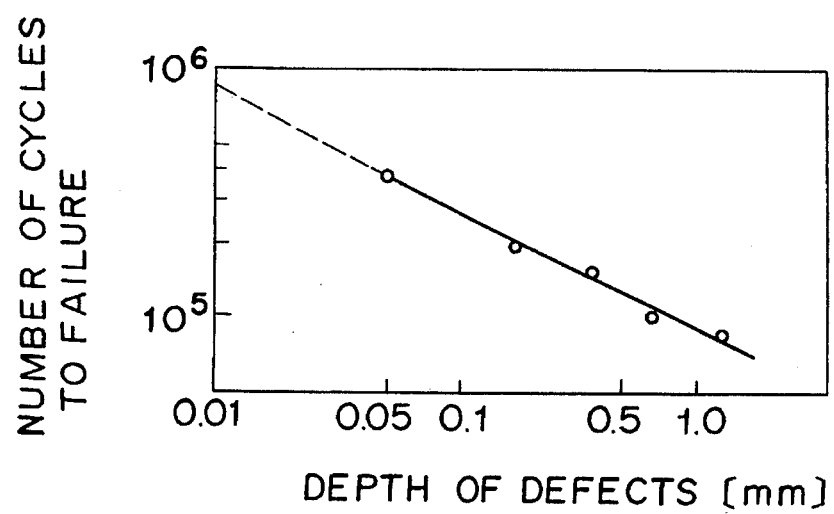
FIGS. 16 and 17 are graphs showing the influence of defect depths to number of cycles to failure; and the influence of a decarburization layer exerted to a fatigue strength of a spring steel.
Figure 17:
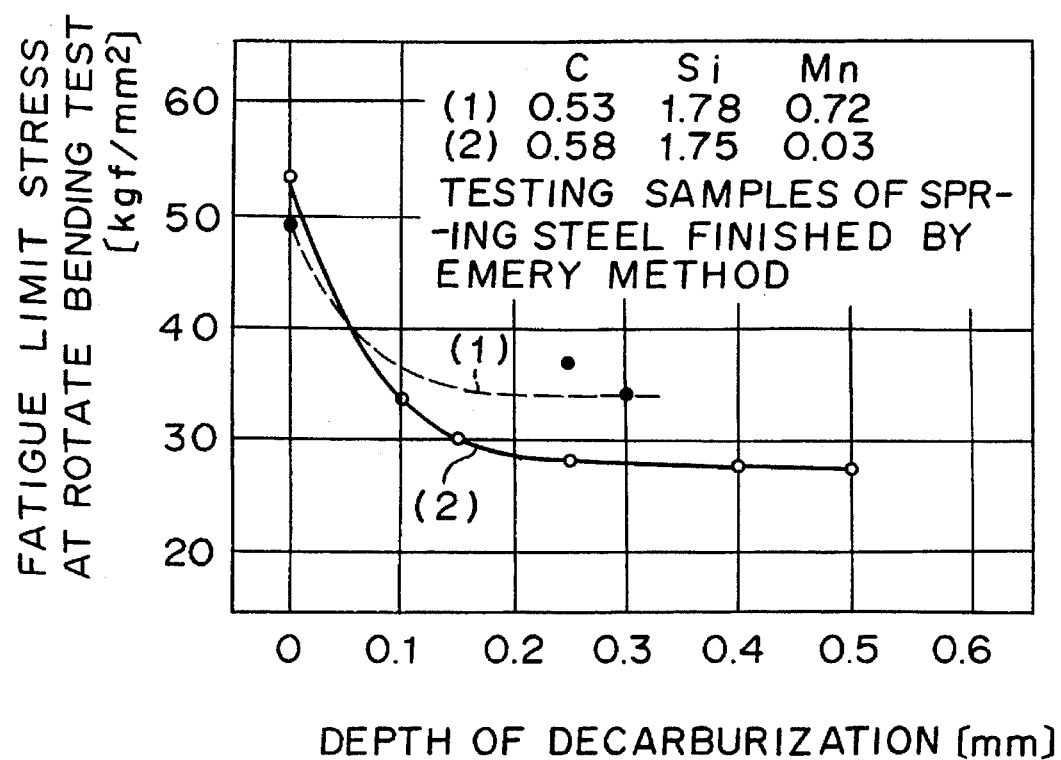

The bending R portion A-B of the seamless steel pipe 20 becomes a flat part 21 formed in an ellipse shape in section as shown in FIG. 2. The flat rate of part 21 is calculated by the following formula, formula 2:

flat rate $H(\%) = (D_0 - D_1)/D_0 \times 100$ wherein $D_0$: material diameter $D_1$: minimum diameter When the bending R portion A-B formed as an ellipse is subjected to bending process by a pipe bender as described above, the sectional form of the bending R portion A-B becomes nearly circular as shown in FIG. 13.

In FIG. 13, let a minimum diameter and a maximum diameter of the circular section be $D_1$ and $D_2$, respectively, and let the difference from the true circle be a true degree T, the true circle degree T is a calculated by the following formula, formula 3:

True circle degree=$T_1/D_2$ wherein, $D_1$: minimum diameter $D_2$: maximum diameter.

Figure 11:
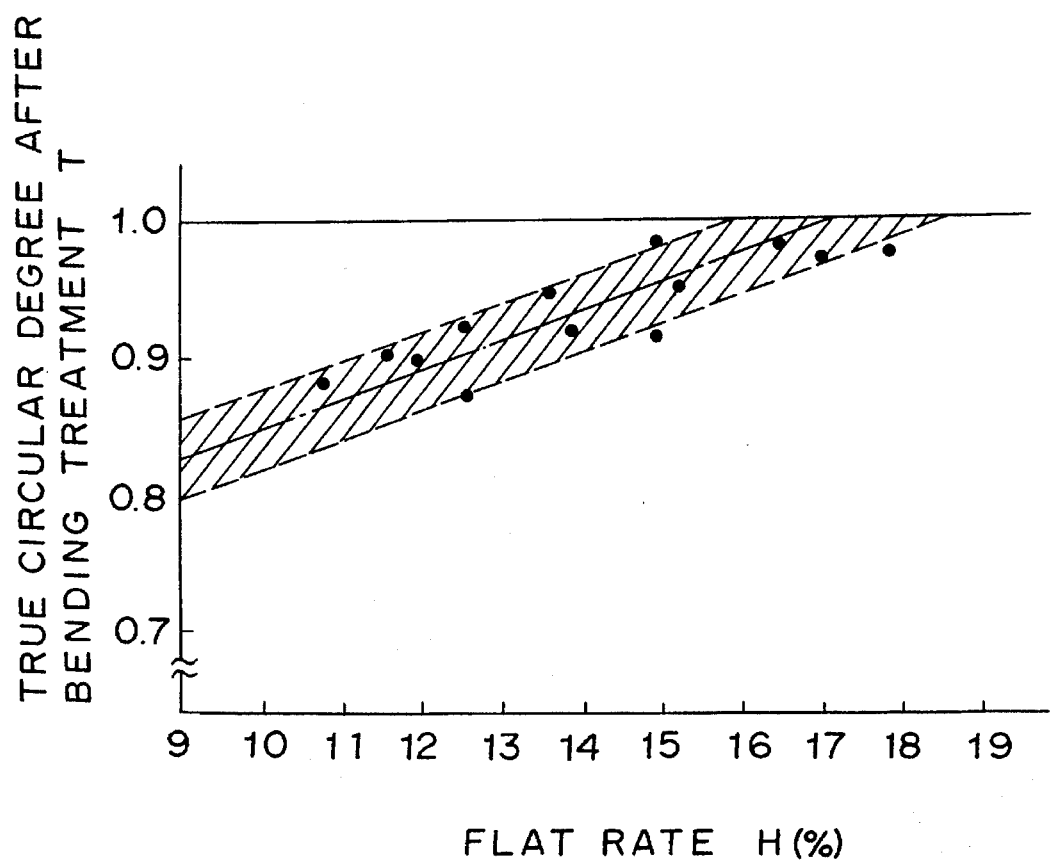
FIG. 11 is a chart which shows the relation between a flat rate of a material heat-finished seamless steel pipe and a true circular degree after the bending process in this invention.

FIG. 11 shows the relation between the flat rate (%) and the true circle degree T after bending process.

As known from FIG. 11, in order to access the true circle degree to 1, a flat rate of a part corresponding to the bending R portion A-B of the heat-finished seamless steel pipe 20 formed at said ellipse form should be 10–19%, and preferably 15–19%. As known from the results of the test, when the flat rate is less than 10% and over 19%, a satisfactory true circle degree was not obtained.

Figure 12:
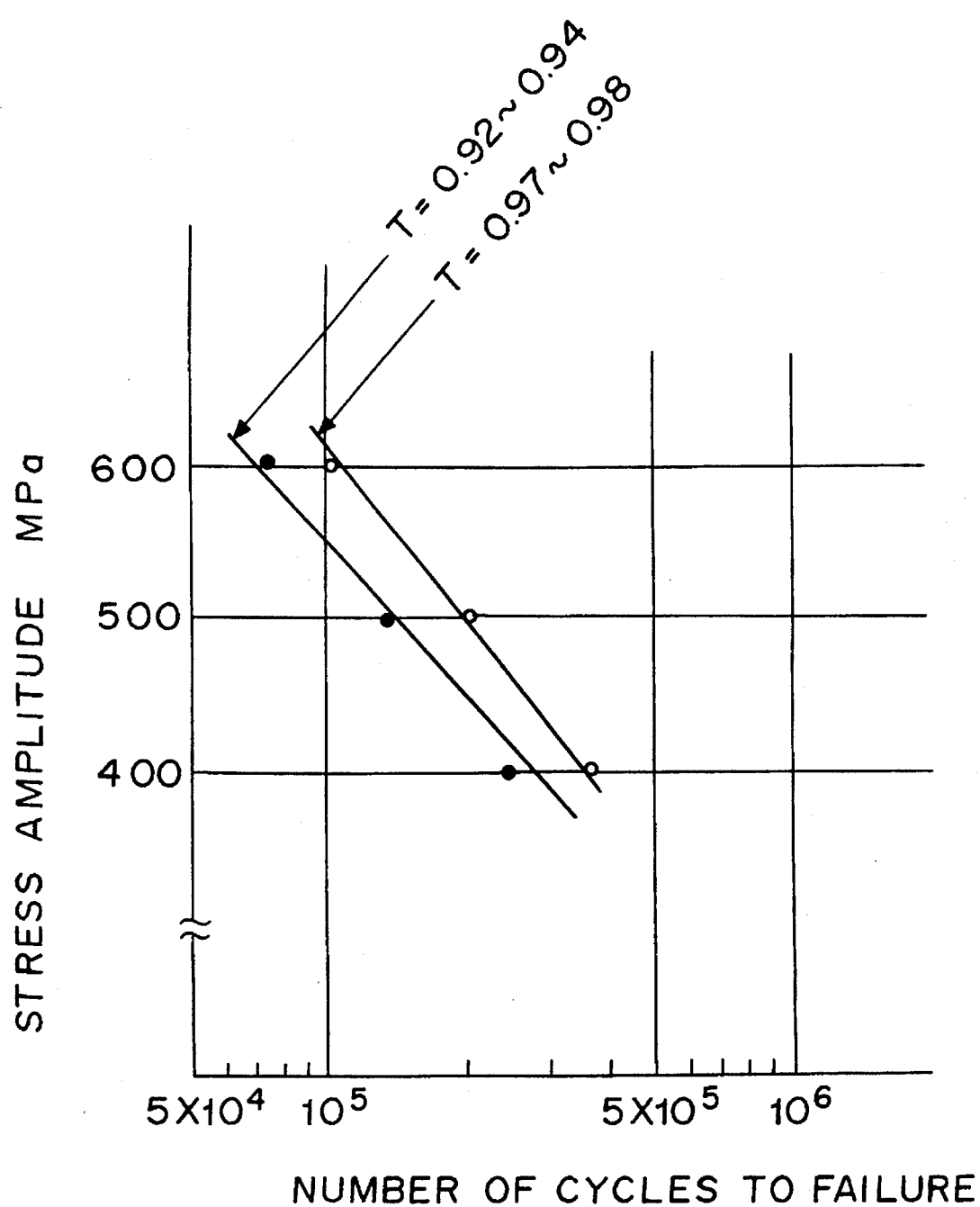
FIG. 12 is a fatigue characteristic chart when a true circular degree of the hollow stabilizer of this invention is changed.

FIG. 12 shows the relation between the true circle degree of the hollow stabilizer and the durability thereof.

This figure shows the fatigue characteristics of the bending R portion A-B of the material heat-finished seamless steel pipe (black skin) 20 wherein said bending R portion is previously formed to be a sectional ellipse having about 13% and 17% of a flat rate, and then subjected to the bending process by a pipe bender described hereafter, thereby obtaining a true circle degree 0.92–0.91 and 0.97–0.98.

As known from the test results, the improvement of the true circle degree T from 0.92–0.94 to 0.97–0.98, or the improvement of about 5% of the true circle degree and the improvement of about 40% of the durability (the repeated number) is confirmed.

Figure 19:
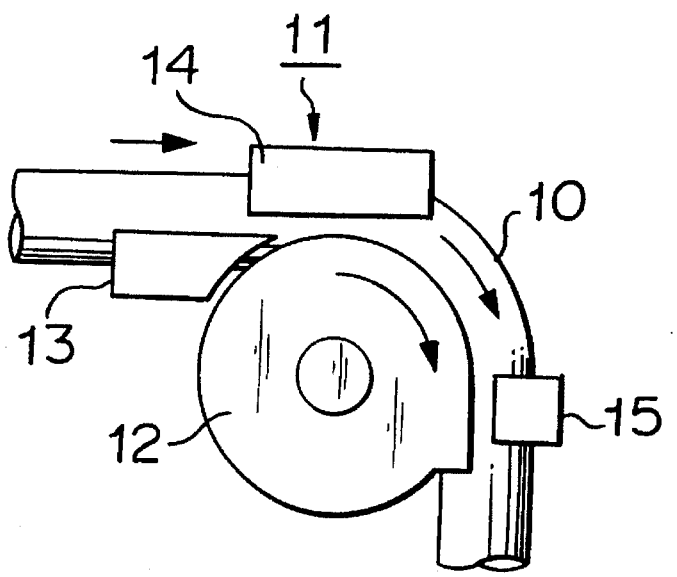
FIG. 19 is a side view which shows an operational state of the same pipe bender.
Figure 20:
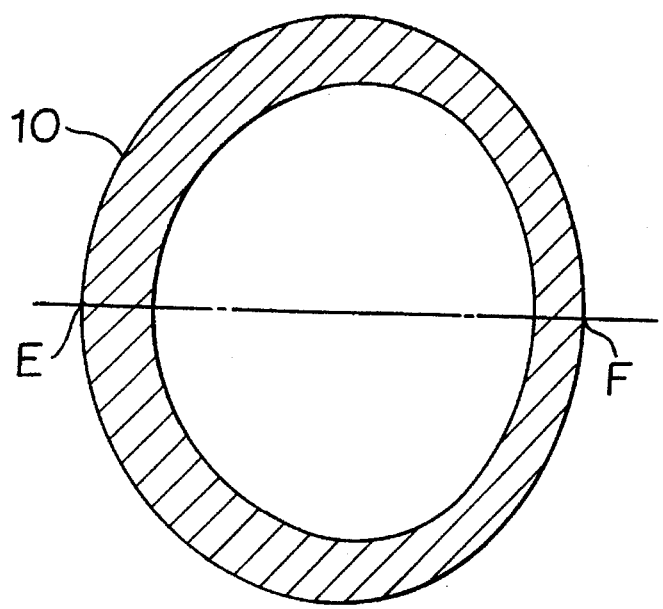
FIG. 20 is an enlarged sectional view of a hollow stabilizer subjected to a bending process by the same pipe bender.
Figure 21:
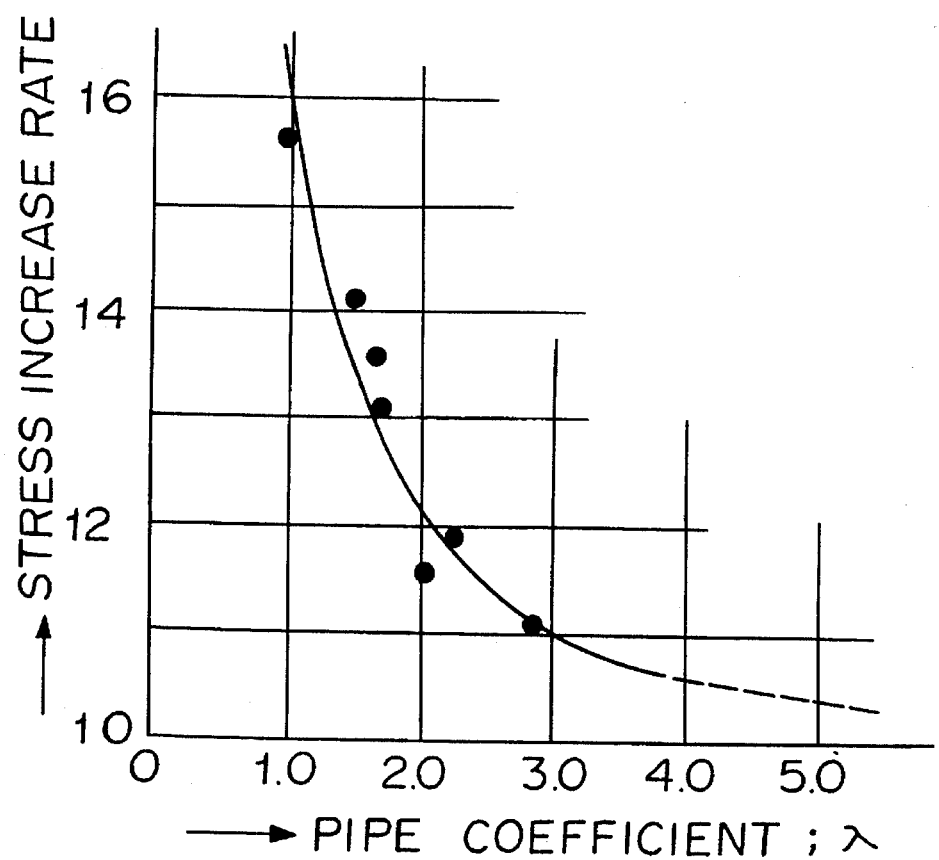
FIG. 21 is an explanatory chart which shows the relation between a pipe coefficient and a stress increase rate.

As described above, the part corresponding to the bending R portion A-B of the material heat-finished seamless steel pipe 20 is formed so that the section long in an axial direction which combines the inner and the outer sides of the bending center C may be an ellipse form, and subjected to a bending process, thereby being able to work the sectional shape after bending process to be nearly a circle (FIG. 13) as shown in FIG. 11. As a result, improper conditions such as an axis which combines the inner sides and the outer sides of the bending center becoming a flat section in a vertical direction when the steel pipe is bent with a circular section as shown in FIGS. 19, 20, thereby causing an increase in stress and a decrease in durability equivalent to the stress increase, can be removed.

Figure 8:
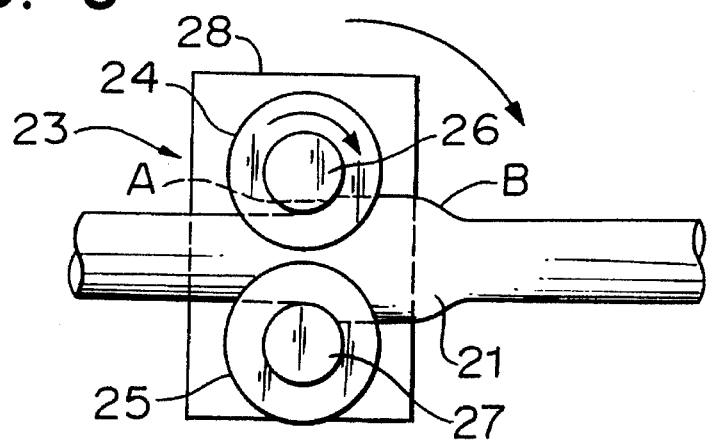
FIG. 8 is a side which shows an embodiment of a pipe bender.
Figure 9:
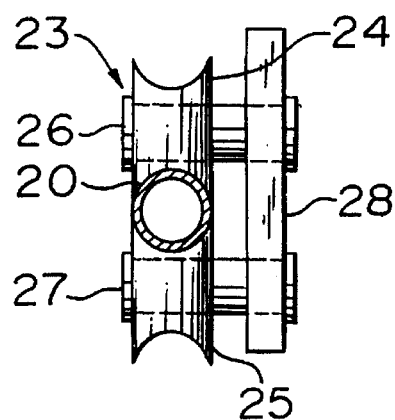
FIG. 9 is an elevation view of the same pipe bender.
Figure 10:
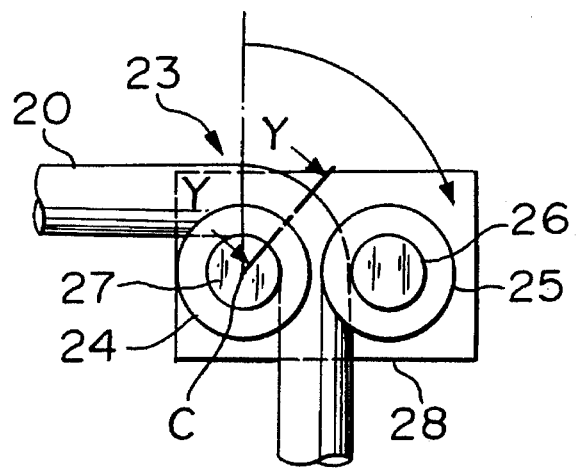
FIG. 10 is an operational explanatory view of the same pipe bender.

Further, the more the cutting section at the bending R portion is closed to a true circle, the more its fatigue strength and durability increases. FIGS. 8 to 10 show an embodiment of a pipe bender which is a device for carrying out the bending process of the invention of claim 2. FIG. 8 is side view, FIG. 9 is an elevation view and FIG. 10 is an operational explanatory view.

The pipe bender 23 used for the bending process shown in FIG. 8 to FIG. 10 is provided with two bending rolls 24, 25. Each bending roll 24, 25 forms a hand drum shape and abuts against a half part and other half part of the outer periphery surface of the heat-finished seamless steel pipe 20 respectively so as to press it. Both bending rolls 24, 25 are supported by a plate link 28 arranged at the side thereof in parallel and rotatable with each other. Accordingly, said bending rolls 24, 25 move rotating with a curvature radius set arbitrarily whereby the part 21 corresponding to the bending R portion A-B of the heat-finished seamless steel pipe 20 is adapted to be subjected to the bending process.

When the heat-finished seamless steel pipe 20 is subjected to the bending process with said pipe bender 23, said heat-finished seamless steel pipe 20 to be worked is inserted between bending rolls 24 and 25 as shown in FIG. 8 and FIG. 9 and an initial point A of the part corresponding to the bending R portion A-B formed previously in sectional ellipse form is arranged between the bending roll 24, 25. In this embodiment, the bending roll 24 positioned at the inner side of the bending center C and the bending roll 25 positioned at the outer side of the bending center C are allowed to move by a certain curvature radius and a fixed rotative angle, e.g. 70°, 80°, or 90° previously determined according to the hollow stabilizer form as shown in FIG. 10. By this, the heat-finished seamless steel pipe 20 can be subjected to the bending process at a certain angle (90° in embodiment) as shown in FIG. 10.

As described above, by performing a bending process the part corresponding to the bending R portion A-B of the heat-finished seamless steel pipe 20 at the certain angle, the hollow stabilizer 20 of hot finishing can be manufactured.

Further, at the time of the bending process, although the bending R portion A-B of the heat-finished seamless steel pipe is pressed between the inside and outside of the bending center C, in this embodiment, since the part corresponding to the bending R portion A-B is previously formed so that the section long in the axial direction which combines the inside and the outside of said bending center C may be an ellipse form, and the section can be finished nearly a circular form at the step where said bending R portion A-B is subjected to the bending process.

Figure 18:
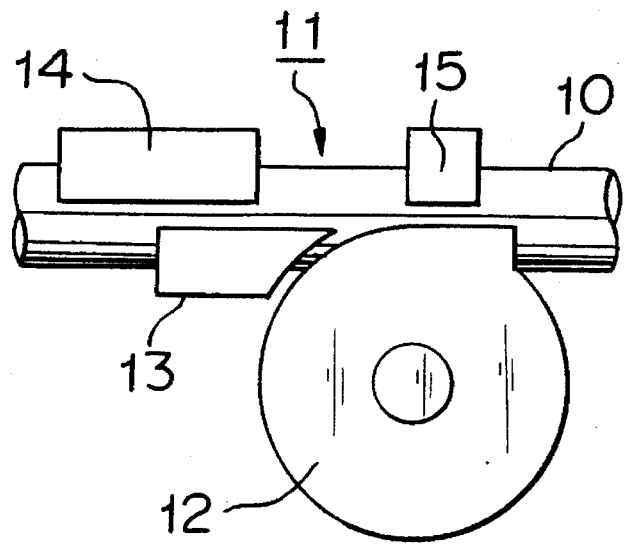
FIG. 18 is a side view of a conventional pipe bender generally used.

The heat-finished seamless steel pipe 20 is not limited to the pipe bender 23 shown in FIGS. 8–10. For instance, other pipe benders as shown in FIG. 18 and FIG. 19 may also be used. In this embodiment, instead of a seam-welded steel pipe having a welding bead portion which partially includes low fatigue strength portions being used as hollow stabilizer material, a heat-finished seamless steel pipe 20 which provides a high fatigue strength and nearly uniform durability is used, whereby a light-weight hollow stabilizer having a superior endurance capable of withstanding heavy loads can be obtained.

Further, in this embodiment, the part corresponding to the bending R portion A-B of the heat-finished seamless steel pipe is previously formed so that the section long in the axial direction which combines the inside and the outside of said bending center C may be an ellipse form and the section form after bending process of said bending R portion A-B may be nearly circular. Accordingly, the durability of the hollow stabilizer can be improved more.

Furthermore, in this embodiment, since the flat rate of the ellipse form of the part corresponding to said bending R portion is set at 10–19%, preferably 15–19%, the sectional form of the bending R portion A-B can be accessed to a circular form more securely, thereby being able to obtain superior durability.

An embodiment of a method of manufacture according to this invention applied to the stabilizer for a large truck is next described as follows.

In this invention, at least either one of the inner surface $S_1$ and the outer surface $S_2$ of the part corresponding to the bending R portion A-B of the material seamless steel pipe 20 of hot rolling is polished to remove the steel pipe surface defects, and after the surface roughness is made less than Rmax 50 μm, the section is formed to be an ellipse long in an axial direction which combines the inner side E and the outer side F of the bending center C. The bending process is then performed by said pipe bender whereby the sectional form of the bending R portion A-B after the bending process is adapted to be nearly circular.

The heat-finished seamless steel pipe 20 used for this invention is manufactured the same as aforementioned. This seamless steel pipe 20 has polished either the inner surface $S_1$ or the outer surface $S_2$, or both of the parts corresponding to the bending R portion A-B by the same polishing method above, preferably with a depth of polishing K=0.05–0.5 mm for removing surface defects of said steel pipe. Further, the surface roughness is made smooth less than Rmax 50 μm, preferably Rmax 10–30 μm.

Then, the part corresponding to the bending R portion A-B is, the same as in the embodiment of claim 2, pressed to a certain flat rate H, e.g., H=10–19%, and preferably H=15–19% in a vertical direction by a conventional pushing type so that the section may be an ellipse form to be long in an axial direction which combines the inside E and the outside F of the bending center C.

Further, the bending process is carried out by the pipe bending shown in FIG. 8–FIG. 10, and the sectional form of the bending R portion A-B after the bending process is formed nearly circular, e.g., a true circle degree T=0.97–0.98, thereby manufacturing a hollow stabilizer.

The fatigue strength of the hollow stabilizer thus manufactured is, as known from the test results of the fatigue characteristics shown in FIG. 4 to FIG. 7 and FIG. 13, improves the durability of the hollow stabilizer more sharply due to the additive effect and the multiplying effect.

In this invention, since either the inner surface or outer surface, or both surfaces of the part corresponding to the previously determined bending R portion A-B of the heat-finished seamless steel pipe 20 is polished to remove surface defects and the bending process is carried out after the surface roughness is made less than 50 μm, the decrease of fatigue strength due to the influence of various kinds of cracks and the decarburization layer of the material heat-finished seamless steel pipe 20 is prevented, thereby considerably improving durability.

Further, since only the position corresponding to the bending R portion A-B is polished to remove surface defects, there is no need for carburizing treatment to prevent decarburization. Accordingly, a cost increase is avoidable and a hollow stabilizer can be produced more economically.

Furthermore, by making the depth of the polishing K to 0.05– 0.5 mm and the surface roughness to Rmax 10–50 μm, or by preferably making K=0.05–0.5 mm and Rmax 10–30 μm, the surface defects of the heat-finished seamless steel pipe 20 are removed more effectively and the surface is made smooth, whereby the fatigue strength of the hollow stabilizer is improved sharply and durability can also be improved.

Still further, in this embodiment, either the inner surface or outer surface, or both surfaces of the part corresponding to the bending R portion A-B of the heat-finished seamless steel pipe 20 are polished to remove surface defects and to make the surface smooth, and the part corresponding to said bending R portion A-B is formed to be an ellipse section long in an axial direction which combines the inner side and the outer side of the bending center beforehand, and the part corresponding to said bending R portion is formed nearly circular in section after the bending process thereof. Accordingly, the decrease in durability due to the increase in stress caused by the fact that the sectional form of the bending R portion A-B is formed to be flat, can be deleted whereby the durability of the hollow stabilizer is improved greatly.

In addition, in this embodiment, since the flat rate of the ellipse form of the part corresponding to said bending R portion A-B is 10–19%, and preferably 15–19%, the sectional form of the bending R portion A-B after the bending process can be securely accessed to a circular form, thereby being able to better improve durability.

In the first embodiment of the present invention, since the heat-finished seamless steel pipe which enables manufacture of a seamless steel pipe having a high fatigue strength and a uniform fatigue strength is used as a material of the hollow stabilizer, a light and highly durable hollow stabilizer can be produced as an automobile stabilizer. Further, since the part corresponding to the bending R portion of the material steel pipe is polished to remove the surface defect and the surface smoothed before the bending process, the decrease of the fatigue strength due to the various kinds of cracks and decarburization layers and the like can be prevented, whereby a strength able to withstand large loads can be maintained even if used in a large car as a stabilizer. Furthermore, there is no need for carburizing treatment to prevent decarburization, and since only the required portion is polished, costs can be reduced.

In the second embodiment of the present invention, in the same heat-finished seamless steel pipe, the part corresponding to the bending R portion of the material steel pipe is previously formed in a sectional ellipse form having a certain flat rate so as to be nearly circular after the bending process. By making the sectional form of the bending R portion flat, stress is increased whereby a corresponding decrease in durability can be avoided and an increase in the fatigue strength of the hollow stabilizer and improvement of durability can be obtained. It is also possible to decrease its production cost by restricting the sectional ellipse form portion only at the bending portion of the steel pipe.

In the third embodiment of the present invention, in the same heat-finished seamless steel pipe, the part corresponding to the bending R portion of the steel pipe is polished to remove surface defects and smoothed, thereby preventing decrease in fatigue strength due to the various kinds of cracks and decarburization layer of the surface of the steel pipe. Further, the part corresponding to the bending R portion is formed to be a sectional ellipse so as to form nearly a circular section after the bending process. By making the sectional form of the bending R portion flat, stress is increased whereby the corresponding decrease in durability can be avoided and a large increase in the durability of the hollow stabilizer can be obtained. Further, since the heat-finished seamless steel pipe is used, a weight decrease in a car stabilizer can be obtained and carburizing treatment is also unnecessary. The restriction of both polishing portion and forming in an ellipse to just bending R portion produces a great cost reduction.

In the fourth embodiment of the present invention, since the depth of the polishing for removing the defects on the surface of the steel pipe is 0.05–0.5 mm, the surface defects of the part corresponding to the bending R portion in the heat-finished seamless steel pipe can be removed to an extent which does not affect practical use together with controlling polishing costs.

Since the depth of the polishing is made 0.05–0.5 mm, and the surface roughness can be finished to be 10–30 μm in order to remove surface defects on the steel pipe, the surface thereof can be finished more smoothly in addition to the control of polishing costs and the removal of surface defects of said steel pipe, thereby being able to improve the fatigue strength of the hollow stabilizer.

Since the flat rate of the ellipse form to make the bending R portion after the bending process to circular form is determined 10–19%, the sectional form of the bending R portion after the bending process can be accessed to a circular form thereby being able to improve durability.

Since the flat rate of the ellipse form for making the bending R portion a circular form is 10–19%, the sectional form of the bending R portion after the bending process can be accessed to a circular form more clearly thereby improving the durability more securely.

What is claimed is:

1. A method of manufacturing a hollow stabilizer for a car which comprises the steps of polishing to remove defects of the surface of a heat-finished seamless steel pipe at an inner surface or an outer surface only at R portions to be bent; adjusting the surface roughness to not greater than Rmax 50μ, and bending the steel pipe at said R portions to form a stabilizer.

2. A method of manufacturing a hollow stabilizer for a car which comprises the steps of polishing to remove defects of the surface of a heat-finished seamless steel pipe at an inner surface or an outer surface at R portions to be bent; adjusting a surface roughness to not greater than Rmax 50 μm; processing said steel pipe at the R positions to be bent, so that the section which has a certain flat rate is a long ellipse form in an axial direction extending an inner side and an outer side of the bending center; and bending said steel pipe at the R positions to form a stabilizer, whereby the sectional form of the bending R portion after bending is in a nearly circular form.

3. A method of manufacturing a hollow stabilizer according to claim 1, wherein a depth of polishing is 0.05–0.5 mm.

4. A method of manufacturing a hollow stabilizer according to claim 1, wherein a depth of said polishing is 0.05–0.5 mm and a surface roughness is finished Rmax 10–30 μm.

5. A method of manufacturing a hollow stabilizer according to claim 2, wherein a depth of polishing is 0.05–0.5 mm.

6. A method of manufacturing a hollow stabilizer according to claim 2, wherein a depth of said polishing is 0.05–0.5 mm and a surface roughness is finished Rmax 10–30 μm.

7. A method of manufacture of a hollow stabilizer according to claim 2, wherein a flat rate of said ellipse form is 10–19%.

8. A method of manufacture of a hollow stabilizer according to claim 3, wherein a flat rate of said ellipse form is 10–19%.

9. A method of manufacture of a hollow stabilizer according to claim 4, wherein a flat rate of said ellipse form is 10–19%.

10. A method of manufacture of a hollow stabilizer according to claim 2, wherein a flat rate of said ellipse form is 15–19%.

11. A method of manufacture of a hollow stabilizer according to claim 3, wherein a flat rate of said ellipse form is 15–19%.

12. A method of manufacture of a hollow stabilizer according to claim 4, wherein a flat rate of said ellipse form is 15–19%.

* * * * *